United States Patent [19]
Cleer, Jr.

[11] 3,958,755
[45] May 25, 1976

[54] HYDRO-THERMO FIREPLACE AND HEATING SYSTEM THEREFOR

[75] Inventor: Clarence W. Cleer, Jr., Kane, Pa.

[73] Assignee: Ridgway Steel Fabricators, Inc., Ridgway, Pa.

[22] Filed: Aug. 5, 1974

[21] Appl. No.: 495,107

[52] U.S. Cl. ............................... 237/8 R; 237/56; 237/61; 237/19; 126/271; 126/132; 237/1 A
[51] Int. Cl.² ...................... F24D 3/00; F24J 3/02
[58] Field of Search ................ 237/51, 56, 19, 55, 237/61, 8 R, 1 A; 126/120–124, 132, 164, 165, 271; 165/DIG. 4

[56] References Cited
UNITED STATES PATENTS

| | | | |
|---|---|---|---|
| 192,782 | 7/1877 | Moore | 126/132 |
| 495,418 | 4/1893 | Lewis | 126/132 |
| 556,807 | 3/1896 | Connell et al. | 126/132 |
| 670,066 | 3/1901 | Smoak | 126/132 |
| 1,004,888 | 10/1911 | McIntyre | 126/271 |
| 1,122,989 | 12/1914 | Newkumet | 237/56 |
| 1,252,176 | 1/1918 | Read | 126/132 |
| 1,294,517 | 2/1919 | Motley | 237/61 |
| 1,338,644 | 4/1920 | Arthur et al. | 126/271 |
| 1,425,174 | 8/1922 | Cantter et al. | 126/271 |
| 1,426,976 | 8/1922 | Gabet | 126/132 |
| 1,467,474 | 9/1923 | Day | 237/56 |
| 1,576,899 | 3/1926 | Clanton | 126/132 |
| 1,583,255 | 5/1926 | Moore | 126/271 |
| 1,670,913 | 5/1928 | Stricker | 237/56 |
| 1,888,620 | 11/1932 | Clark | 237/1 A |
| 2,311,579 | 2/1943 | Scott | 126/271 |
| 2,469,496 | 5/1949 | Christenson | 126/271 |
| 3,007,470 | 11/1961 | Heeger | 237/8 R |
| 3,096,021 | 7/1963 | Lintvedt | 237/56 |
| 3,390,672 | 7/1968 | Snelling | 126/271 |

FOREIGN PATENTS OR APPLICATIONS

| | | | |
|---|---|---|---|
| 753,719 | 7/1956 | United Kingdom | 126/132 |
| 483,059 | 7/1953 | Italy | 237/56 |

*Primary Examiner*—William E. Wayner
*Assistant Examiner*—Henry C. Yuen
*Attorney, Agent, or Firm*—Cushman, Darby & Cushman

[57] ABSTRACT

A fireplace jacket assembly and heating system associated therewith. A fireplace jacket assembly including water chambers on five sides of an open wood-burning fireplace having means for providing water communication and circulation therebetween is placed in a conventional heating or hot water system. A pump circulates the water between the component parts of the system including a water storage tank and a radiator, and means are provided responsive to the temperature of water within the storage tank for preventing heating thereof by conventional (i.e., fossil fuel or electricity) means, or by a solar heating system. An opening formed in the bottom of the fireplace jacket provides for greater efficiency.

7 Claims, 3 Drawing Figures

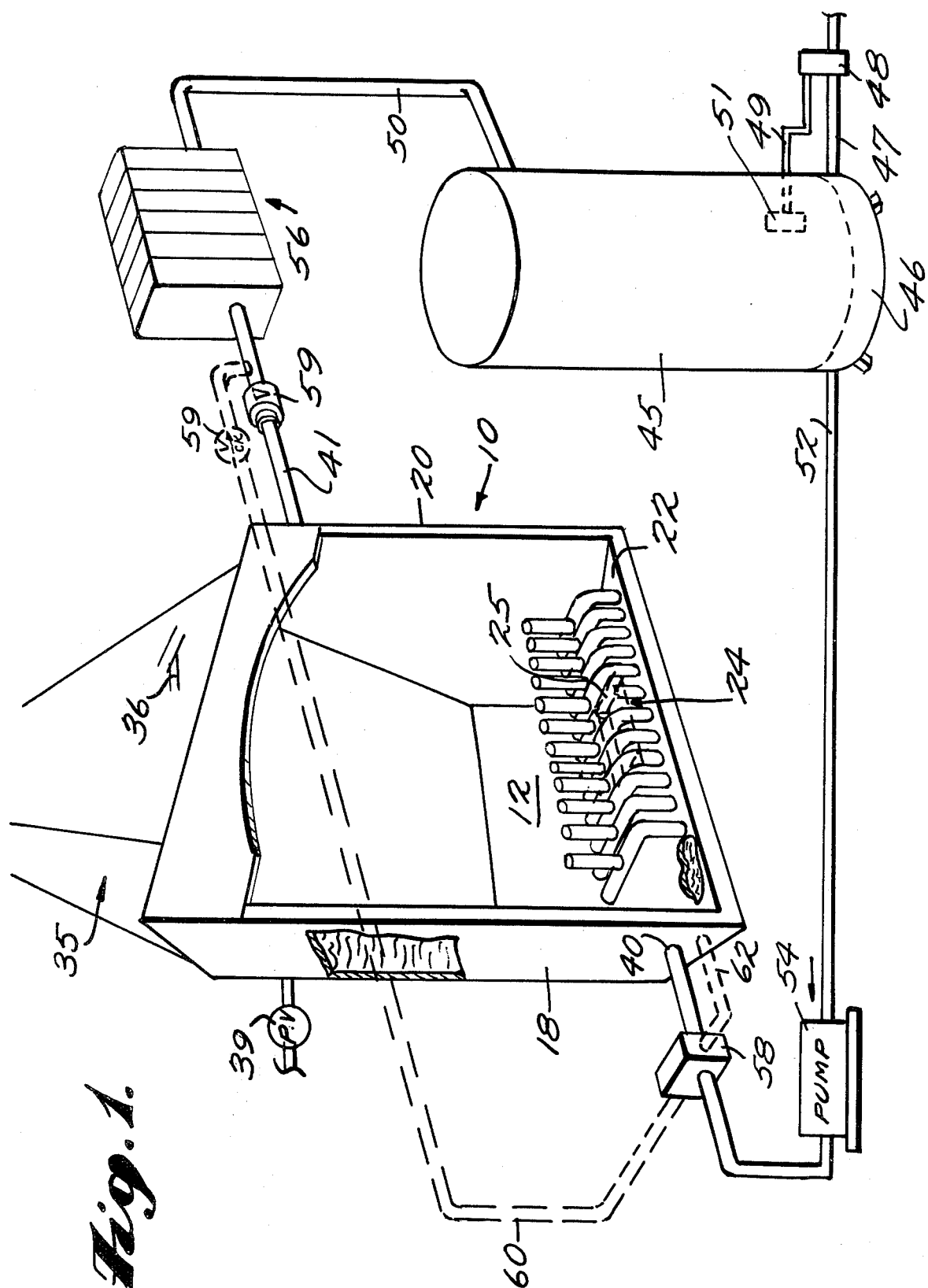

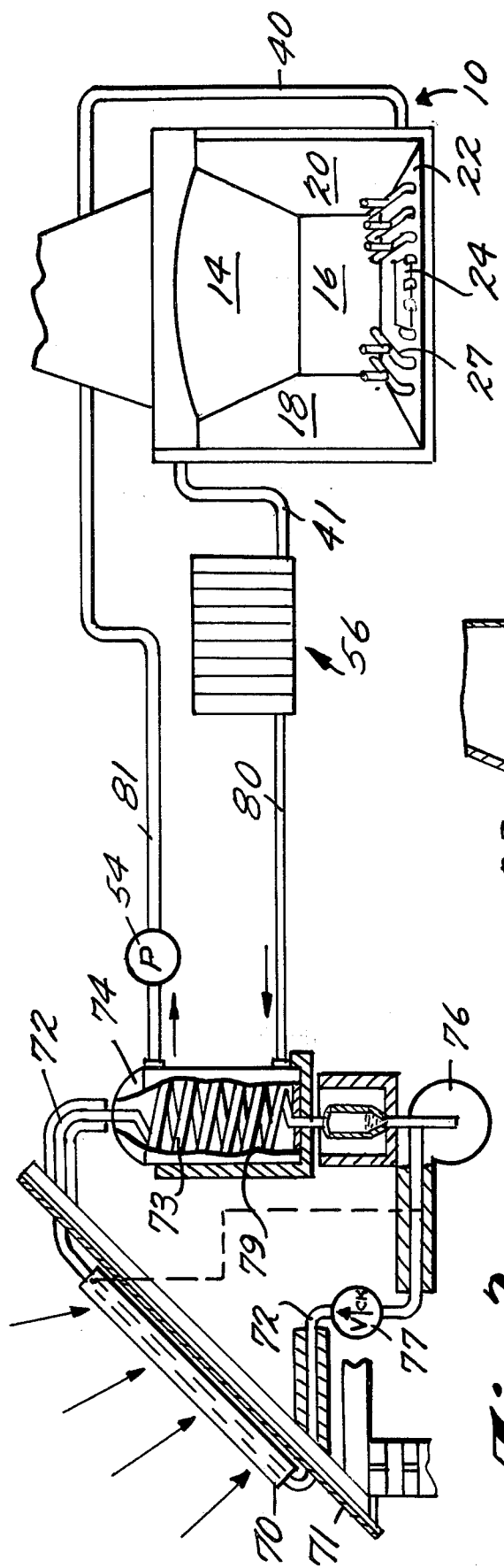
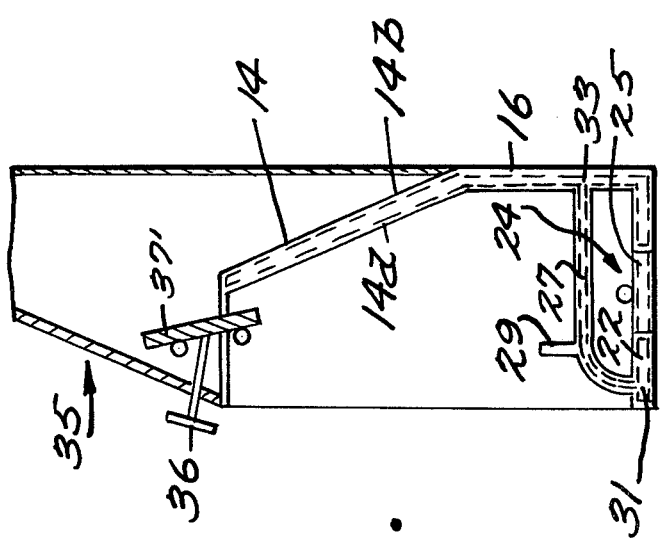

HYDRO-THERMO FIREPLACE AND HEATING SYSTEM THEREFOR

BACKGROUND AND SUMMARY OF THE INVENTION

The invention relates to a means for heating a building or for heating hot water for the building comprising in part a means adapted to use the heat from an open wood-burning fireplace. In the past, it has been generally known to use the heat from a fireplace to heat water passed around the open fire — such as shown in U.S. Pat. Nos. 219,978, 1,352,371, 1,432,538, and 2,113,896 — however, none of these systems has been useful as an auxiliary in homes with conventional heating or hot-water heating systems, nor have any of these devices provided as great an area for heat transfer as the device of the present invention.

With depletion of our natural resources of oil and natural gas, and with increasingly higher electricity prices it is becoming more and more practical to use wood burned in an open fire as a heat source. In addition to having the potential of meeting a large portion of a home's heating requirements, open wood-burning fireplaces are decorative and often serve as a focal point for family activities. However, it is usually impractical to assume, as have many prior art devices, that wood burned in an open fireplace can provide all the heating or hot-water heating requirements of a home since a fire must be constantly attended to and since large quantities of wood are impractical to store in most homes and locations. However, according to the teachings of the present invention, such a fireplace if hooked up with the conventional heating or hot-water heating systems of a home can supply a good deal of auxiliary heat, and can thereby save on utility bills and difficult to obtain natural resources while providing aesthetic appeal as well.

According to the present invention, a metal water jacket having spaced top, back, bottom, and side walls forming water chambers therebetween and together defining a wood-burning fireplace is provided. A grate adapted to support wood for a fire is disposed within the fireplace, said grate having hollow interior portions thereof that are in water-communication with the water chambers on the bottom and back of the fireplace. All of the water chambers are in free water-communication with each other. Water coming in through an inlet is circulated through the jacket and absorbs heat from the fire burning within the fireplace, and then the hot water by convection passes out a water outlet. The bottom of the jacket has an opening formed therein in order to provide combustion air to the fire and increase the heating capability thereof, while additionally reducing materials expense, without interfering with water circulation through the jacket.

The metal water jacket inlets and outlets are connected up with the conventional pipes of the heating or hot-water heating system of a building, a conventional pump circulating water from the fireplace through the radiators and water storage tank, and interconnecting pipes thereof. A means is provided responsive to the temperature within the hot water storage tank for cutting off the fuel supply (or other means essential to heating of the water by conventional means) when the temperature of water in the tank reaches a certain level due to heating thereof by the fireplace. In addition, means may be provided for cutting out the fireplace from the water circulating system when it is not desired to use the fireplace, or else the fireplace may be left in the system to act as a radiator. The fireplace may be hooked up with solar heating systems, gas-burning ones, fuel oil ones, or electric heating systems, and means may be provided for modifying the system to provide forced air heating instead of water heating.

BRIEF DESCRIPTION OF THE DRAWINGS

FIG. 1 is a perspective diagrammatic view of a heating system according to the present invention;

FIG. 2 is a cross-sectional view of the water jacket shown in FIG. 1 taken along lines 2—2; and FIG. 3 is a view of another heating system according to the present invention, showing one portion of the heating system in partial cross-section and a front view of the water jacket.

DETAILED DESCRIPTION OF THE DRAWINGS

FIG. 1 shows a heating system for a building including a conventional heating system and a jacket 10 for an open-wood-burning fireplace according to the teachings of the present invention. The jacket 10 defines a fireplace 12 in the interior thereof, the fireplace 12 being confined on all sides by the jacket 10 and chimney means 35 associated therewith except for an open front.

The jacket 10 comprises a top portion 14 (see FIGS. 2 and 3 especially), a back portion 16, side portions 18 and 20, and a bottom portion 22. Each of these portions includes spaced metal wall members (i.e., 14a, 14b) defining a water holding chamber therebetween. Although the dimensions may be varied depending upon the total size of the fireplace and building in which it is located, it is preferred that the walls forming each of the chambers 14, 16, 18, 20 and 22 be spaced approximately 1 7/16 inch apart. Note too that it is preferred that the walls of side chambers 18, 20 slant back so the jacket may be easily fit into an area of a building wall adapted to receive a fireplace.

Within the fireplace 12 are disposed a plurality of L-shaped hollow grate members 27. Each member 27 has a solid upstanding rod portion 29 thereof adapted to retain logs on the long leg of the members 27, and each member is connected at 31 to the bottom water chamber 22 and at 33 to the back chamber 16. Note that free communication is provided between all the chambers 14, 16, 18, 20 and 22 and the interiors of the grate members 27.

Although any suitable heat-conducting material is suitable for forming the structural components of the jacket 10, preferably all the walls of all the chambers will be formed of plate steel, the individual wall portions being welded together at the interfaces thereof. The hollow grate members 27 are preferably made of steel pipe.

Formed in the bottom chamber 22 is an opening 24. The opening 24 is defined by wall portions 25 of the bottom chamber 22, and it provides a combustion air intake. The provision of this combustion air intake 24 increases the efficiency of the burning in the fireplace and thus the heat transfer to the water within the chambers.

It will be appreciated that the jacket of the present invention provides for maximum heat transfer of heat from the fire to the water in the water chambers surrounding the fire since water is circulating on all sides (five) except the open front of the fireplace, and since there is free communication between all of the chambers. Also, since the water inlet 40 is disposed at the bottom of one of the chambers (18 in FIG. 1) and water outlet 41 is disposed at the top of a chamber opposite to the chamber of the water inlet (20 in FIG. 1), water must be significantly heated by moving past the fire on all sides thereof before it is moved up to the outlet by natural convection. Although prior art proposals (see FIGS. 7 and 11 of U.S. Pat. No. 1,352,371 for instance) have suggested that water be circulated within a grate and around several sides of a fire, none of the prior art proposals contemplates an open wood-burning fireplace surrounded on five sides thereof closely adjacent to the fire with free-communicating water conducting chambers and with water circulating through hollow grate portions and with an opening in the bottom chamber for more complete combustion and efficiency, as taught by the present invention.

Located on top of the water jacket 10 is a chimney means 35 which is attached to the top and side chambers (14, 18, 20) of the jacket 10 at various portions thereof and provides for removal of the combustion gases within the fireplace 12. Located within the chimney means 35 is a conventional damper 37 operated by a conventional control handle 36 thereof, which handle extends to the exterior of the chimney means 35 for easy operation thereof.

The outlet pipe 41 of the jacket 10 is connected to means for radiating the heat from the water conducted thereby to various rooms in the building in which it is used — such as radiator(s) 56 — and from there is conducted by suitable means such as pipe 50 to a conventional hot-water storage tank 45 of a conventional heating or hot water system. It is understood that instead of radiators 56 a suitable forced air means blowing over hot water conducting coils could be used as the heat transfer means. As shown in FIG. 1, the water tank 45 has a means shown digrammatically at 46 thereof for heating the water within the tank 45. The means 46 is supplied with fuel or power from a conventional source, such as fuel oil, natural gas, or electricity, through a means 47. A cutoff means 48 is placed within the power or fuel supply 47 and is operatively connected by 49 to a means 51 within the water tank 45 that is responsive to the temperature within the tank 45. When the temperature within the tank is sufficient so that enough heat is being supplied by radiator(s) 56 to the respective areas of the building to be heated — such as when the fireplace 12 has a fire burning therein and water is circulating through the jacket 10 — cutoff means 48 will cutoff the supply of fuel or power to the heater 46 so that it will not operate to further raise the temperature within the tank 45.

Water from storage tank 45 passes through outlet 52 to a conventional pump 54 to be circulated through the jacket 10 and through the system as a whole. The pump 54 provides the motive force for circulating the water throughout the entire heating system (convection of water in the jacket 10 will not be enough to adequately circulate the water throughout the whole system), and may be connected at any suitable location within the heating system. As shown in the drawings it is connected to the inlet 40 of the jacket 10.

Preferably, water is normally circulating through the jacket 10 and the entire heating system at about 12 – 20 psi. As a safety measure, a pressure relief vent 39 is provided in jacket 10 to prevent too high a build-up of pressure within the jacket 10 which might result in rupturing thereof. Although the welded-steel jacket 10 of the present invention is much more pressure-tight and blowout proof than the cast iron water circulating means of prior art devices, since rupture of the jacket 10 might result in scalding of an individual in the vicinity of the fireplace 12, and since there is no simple means of "turning down" the fire within the fireplace 12 without completely extinguishing it, a pressure relief such as 39 is desirable. The pressure relief 39 is preferably adapted to vent at 30 psi, venting being provided to the exterior of the building or any other suitable place, such as a storage tank, etc.

When it is not desirable to use the fireplace 12 but rather to supply the complete heat or hot water needs of a building with the conventional means 45, 46, a valve 58 may be provided in the inlet 40 for the jacket 10 for cutting off the flow of water therethrough, and simultaneously cutting in a by-pass circulating system 60. In conjunction with this, check valves 59 may be provided in the outlets of the system 60 and the pipe 41 so that water flowing from one system cannot go through the other.

The valve 58 may be operated by any suitable means — for instance, it may be manually operated, or it may be connected through 62 to a temperature responsive means within the jacket 10 which activates the valve 58 when the temperature within the jacket 10 is lower than a certain amount (such as would result when there was no fire burning therein). It is sometimes desirable to cut off the jacket 10 from the circulating system since it contains a large volume of water that must be heated by the means 46; however, since it may also act as a radiator even when a fire is not burning therein, it is not always desirable to employ a cutout such as valve 58 when the fireplace 12 has no fire burning therein. Of course, a supply of make-up water can be provided for the system as a whole or any of the component parts thereof.

In addition to being connected up to a conventional heating or hot water system, the jacket 10 according to the present invention could be connected up to any other heating or hot water means, such as a solar heating unit. Any suitable solar heating unit may be so provided as a secondary heating means, such as those shown in U.S. Pat. Nos. 3,390,672, 3,254,703 and 3,254,702. An exemplary suitable solar heating or hot water unit is shown in FIG. 3. This includes a solar collector 70 mounted on a roof 71 of a building, said collector having water-conducting pipes extending therethrough and connected to pipes 72 communicating therewith. The pipes 72 are formed as a coil 73 to increase heat-transfer therefrom within water storage tank 74. Water may be pumped through the system by a pump 76, through a check valve 77 (to keep the water from draining out of the solar collector 70 when the pump 76 is not operating), and the pump 76 is preferably controlled by a means 79 responsive to the water temperature within the tank 74. Thus, just as with the FIG. 1 embodiment, when the temperature in tank 74 reaches a certain degree as a result of heating of water by the fireplace 14, the pump will be cut out, and water circulation through the solar collector 70 terminated. Other cut-off means could be provided for the solar system, such as a cutoff valve in pipe 72.

The water jacket 10 is operatively connected to the solar system by pipes 80 and 81 respectively leading into and from the water storage tank 74. Again, conventional pump 54 and radiator(s) 56 are provided as may be suitable means for cutting out the jacket 10 from the water-circulating system if desired.

It will be thus seen that an improved water heating means associated with an open wood-burning fireplace and a wood-burning heating means connected to a conventional heating system or hot-water system has been provided.

While the invention has been herein illustrated and described in what is presently conceived to be the most practical and preferred embodiments, it will be obvious to one of ordinary skill in the art that many modifications may be made therefrom within the scope of the invention, which scope is to be limited only by the appended claims.

What is claimed is:
1. A heating system comprising
   a. a hot water storage tank,
   b. means for heating water in said water storage tank,
   c. means responsive to the temperature of water within said hot water storage tank for preventing operation of said means for heating water in said hot water storage tank,
   d. a fireplace jacket remote from said means for heating water in said water storage tank and comprising means for circulating water directly around an open-hearth woodburning fireplace adapted to have an open fire therein,
   e. a powered pump,
   f. means for transferring the heat of hot water in said storage tank and fireplace jacket to areas remote from but operatively connected to said tank and jacket, and
   g. means for providing operative communication between said pump, fireplace jacket, hot water storage tank, and heat transferring means so that water heated by an open fire in said fireplace will be circulated to and from said storage tank by said pump and will be in operative communication with said heat transfer means, and so that said means for preventing operation of said means for heating water in said hot water storage tank responsive to the water temperature within said tank will prevent operation of said heating means when the water in said tank is heated above a predetermined temperature by an open fire in said fireplace.

2. A heating system as recited in claim 1 wherein said means for heating water in said hot water storage tank comprises a fossil fuel burner, and wherein said means for preventing operation of said means for heating water in said storage tank comprises a means for cutting off the supply of fossil fuel to said fossil fuel burner.

3. A heating system as recited in claim 1 wherein said means for heating water in said hot water storage tank comprises an electric heating element, and wherein said means for preventing operation of said means for heating water in said storage tank comprises a means for cutting off the supply of electricity to said electric heating element.

4. A heating system as recited in claim 1 wherein said means for heating water in said hot water storage tank comprises a solar heat collector.

5. A heating system as recited in claim 1 further comprising means for by-passing said water jacket with water being circulated from said pump to said storage tank and heat transferring means.

6. A heating system as recited in claim 1 wherein said heat transferring means comprises a radiator conducting hot water therethrough.

7. A heating system as recited in claim 1 wherein said fireplace jacket comprises means defining a fireplace interior, said means including a top water chamber defined by spaced apart metal top walls, a bottom water chamber defined by spaced apart metal bottom walls, two side water chambers each defined by spaced apart metal side walls, and a back water chamber defined by spaced apart metal back walls, means for providing operative water communication among all said chambers, a metal grate disposed within said fireplace interior, said grate formed by means for providing operative water communication between the interior of portions thereof and said bottom and back chambers and adapted to hold wood or the like thereon for open fire burning, means defining an opening in said bottom chamber for providing combustion air to the bottom of said grate and a fire burning therein, a water inlet operatively communicating with one of said side, back, or bottom chambers, and a water outlet operatively communicating with another of said chambers.

* * * * *